(12) United States Patent
Wu et al.

(10) Patent No.: US 12,538,139 B2
(45) Date of Patent: Jan. 27, 2026

(54) CHANNEL MONITORING METHOD AND APPARATUS, CHANNEL TRANSMISSION METHOD AND APPARATUS, TERMINAL, AND NETWORK SIDE DEVICE

(71) Applicant: VIVO MOBILE COMMUNICATION CO., LTD., Guangdong (CN)

(72) Inventors: Kai Wu, Guangdong (CN); Dongru Li, Guangdong (CN); Kun Yang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 483 days.

(21) Appl. No.: 18/094,025

(22) Filed: Jan. 6, 2023

(65) Prior Publication Data
US 2023/0164589 A1   May 25, 2023

Related U.S. Application Data

(63) Continuation of application No. PCT/CN2021/104237, filed on Jul. 2, 2021.

(30) Foreign Application Priority Data

Jul. 6, 2020 (CN) .......... 202010643186.8

(51) Int. Cl.
*H04W 24/00* (2009.01)
*H04W 72/23* (2023.01)

(52) U.S. Cl.
CPC .......... *H04W 24/00* (2013.01); *H04W 72/23* (2023.01)

(58) Field of Classification Search
CPC ... H04W 24/00; H04W 72/23; H04W 72/542; H04W 72/231; H04W 24/08; H04W 72/0446; H04L 1/1812; H04L 1/1854; H04L 5/0092; H04L 5/0053
See application file for complete search history.

(56) References Cited

U.S. PATENT DOCUMENTS

| 2018/0227156 A1 | 8/2018 | Papasakellariou |
| 2020/0022144 A1* | 1/2020 | Papasakellariou .... H04L 5/0044 |
| 2020/0045771 A1 | 2/2020 | Sano et al. |

(Continued)

FOREIGN PATENT DOCUMENTS

| CN | 110352578 A | 10/2019 |
| WO | 2018143331 A1 | 8/2018 |

(Continued)

OTHER PUBLICATIONS

Extended European Search Report for Application No. 21837357.9, dated Oct. 16, 2023, 8 Pages.

(Continued)

*Primary Examiner* — Kiet Tang
(74) *Attorney, Agent, or Firm* — BROOKS KUSHMAN P.C.

(57) ABSTRACT

A channel monitoring method and apparatus, a channel transmission method and apparatus, a terminal, and a network side device. The channel monitoring method of this application includes: monitoring a PDCCH in at least two physical downlink control channel (PDCCH) monitoring occasions, where, each of the PDCCH monitoring occasions corresponds to a part of control channel elements (CCEs) of the PDCCH.

20 Claims, 4 Drawing Sheets

(56) References Cited

U.S. PATENT DOCUMENTS

| | | | |
|---|---|---|---|
| 2020/0119869 A1* | 4/2020 | Taherzadeh Boroujeni | ................ H04L 5/0094 |
| 2020/0245333 A1* | 7/2020 | Lin | ........................ H04L 1/0026 |
| 2022/0150922 A1* | 5/2022 | Wu | ........................ H04W 24/08 |

FOREIGN PATENT DOCUMENTS

| WO | 2018231621 A1 | 12/2018 |
|---|---|---|
| WO | 2021196148 A1 | 10/2021 |

OTHER PUBLICATIONS

First Office Action for Japanese Application No. 2023-501312, dated Dec. 25, 2023, 4 Pages.

LG Electronics "Discussion on PDCCH repetition for URLLC" 3GPP TSG RAN WG1 Meeting #92bis, Sanya, China, Apr. 2018, R1-1804571, 4 Pages.

First Office Action for Indian Application No. 202327007003, dated Apr. 2, 2024, 6 Pages.

Qualcomm. Remaining Issues on UCI Enhancements for URLLC. 3GPP TSG RAN WG1 #101e. R1-2004458. Online. May-Jun. 2020. 15 pages.

Qualcomm Incorporated. PDCCH Enhancements for eURLLC. 3GPP TSG-RAN WG1 AH-1901. R1-1900896. Online. Jan. 2019. 9 pages.

Spreadtrum Communications. Consideration on URLLC physical layer enhancement. 3GPP TSG RAN WG1 Meeting #94bis. R1-1811396. Online. Oct. 2018. 7 pages.

Third Indian Office Action for Indian Application No. 202327007003 mailed May 23, 2025. 19 pages.

First Korean Office Action for Korean Patent Application No. 10-2023-7004091 mailed Apr. 4, 2025. 13 pages.

* cited by examiner

CHANNEL MONITORING METHOD AND APPARATUS, CHANNEL TRANSMISSION METHOD AND APPARATUS, TERMINAL, AND NETWORK SIDE DEVICE

CROSS-REFERENCE TO RELATED APPLICATIONS

This application is a continuation application of International Application No. PCT/CN2021/104237 filed on Jul. 2, 2021, which claims priority to Chinese Patent Application No. 202010643186.8 filed on Jul. 6, 2020, which are incorporated herein by reference in their entireties.

TECHNICAL FIELD

The present disclosure relates to the field of communication technologies, and in particular, to a channel monitoring method and apparatus, a channel transmission method and apparatus, a terminal, and a network side device.

BACKGROUND

In the related art, a physical downlink control channel (PDCCH) can be transmitted at different aggregation levels. The aggregation levels include 1, 2, 4, 8, and 16. A size of the aggregation level indicates a quantity of control channel elements (CCE) used in PDCCH transmission, and higher aggregation level usually leads to better performance. User equipment (UE) monitors the PDCCH in a monitoring occasion (MO) indicated by a search space set (Search Space Set) according to configuration of a network. Complete PDCCH information is detected in one PDCCH MO. Therefore, the UE cannot rely on historical PDCCH transmission and transmission of another monitoring occasion for joint PDCCH detection.

SUMMARY

A purpose of embodiments of this application is to provide a channel monitoring method and apparatus, a channel transmission method and apparatus, terminal, and network side device.

To resolve the foregoing technical problems, this application is implemented as follows:

According to a first aspect, a channel monitoring method is provided, and applied to a terminal. The method includes:
  monitoring a PDCCH in at least two physical downlink control channel (PDCCH) monitoring occasions;
  where, each of the PDCCH monitoring occasions corresponds to a part of control channel elements (CCEs) of the PDCCH.

According to a second aspect, a channel monitoring apparatus is provided, and applied to a terminal. The apparatus includes:
  a monitoring module, configured to monitor a PDCCH in at least two physical downlink control channel (PDCCH) monitoring occasions;
  where, each of the PDCCH monitoring occasions corresponds to a part of control channel elements (CCEs) of the PDCCH.

According to a third aspect, a channel transmission method is provided, and applied to a network side device. The method includes:
  configuring at least two PDCCH monitoring occasions;
  where, each of the PDCCH monitoring occasions corresponds to a part of control channel elements (CCEs) of the PDCCH.

According to a fourth aspect, a channel transmission apparatus is provided, and applied to a network side device. The apparatus includes:
  a first configuration module, configured to configure at least two PDCCH monitoring occasions;
  where, each of the PDCCH monitoring occasions corresponds to a part of control channel elements (CCEs) of the PDCCH.

According to a fifth aspect, a terminal is provided, the terminal including a processor, a memory, and a program or an instruction stored on the memory and executable on the processor, the program or instruction, when executed by the processor, implementing steps of the method according to the first aspect.

According to a sixth aspect, a network side device is provided, the network side device including a processor, a memory, and a program or an instruction stored on the memory and executable on the processor, the program or instruction, when executed by the processor, implementing steps of the method according to the third aspect.

According to a seventh aspect, a readable storage medium is provided, storing a program or an instruction, the program or instruction, when executed by a processor, implementing steps of the method according to the first aspect, or steps of the method according to the third aspect.

According to an eighth aspect, a chip is provided, including a processor and a communication interface, the communication interface being coupled to the processor, and the processor being configured to run a program or an instruction of a network side device to implement the method according to the first aspect, or the method according to the third aspect.

In the embodiments of this application, monitoring of a PDCCH is performed in at least two physical downlink control channel (PDCCH) monitoring occasions, and each of the PDCCH monitoring occasions corresponds to a part of control channel elements (CCEs) of the PDCCH, so that a terminal can achieve joint detection for the PDCCH based on a plurality of PDCCH monitoring occasions, which improves transmission performance of the PDCCH.

DETAILED DESCRIPTION

The following clearly describes the technical solutions in the embodiments of this application with reference to the accompanying drawings in the embodiments of this application. Apparently, the described embodiments are some rather than all of the embodiments of this application. All other embodiments obtained by a person of ordinary skill in the art based on the embodiments of this application without creative efforts shall fall within the protection scope of this application.

The terms such as "first" and "second" in the specification and the claims of this application are intended to distinguish between similar objects, but are not used for describing a specific order or a chronological order. It is to be understood that the terms used in such way are interchangeable in proper circumstances, so that the embodiments of this application can be implemented in other orders than the order illustrated or described herein. In addition, objects distinguished by "first" and "second" are usually of one type, and a quantity of the objects is not limited. For example, a first object may be one or more than one. In addition, "and/or" in the specification and claims represents at least one of connected objects. The character "/" generally indicates an "or" relationship between the associated objects.

It is worth noting that technologies described in the embodiments of this application are not limited to a long term evolution (LTE)/LTE-advanced (LTE-A) system, but may further be used in other wireless communication systems, such as code division multiple access (CDMA), time division multiple access (TDMA), frequency division multiple access (FDMA), orthogonal frequency division multiple access (OFDMA), single-carrier frequency-division multiple access (SC-FMA), and other systems. The terms "system" and "network" in the embodiments of this application are often used interchangeably, and the described technologies may be used for not only the foregoing systems and radio technologies, but also other systems and radio technologies. However, the following description describes a new radio (NR) system for a purpose of example, and an NR term is used in many parts of the following description. These technologies are also applicable to an application other than an NR system application, such as a $6^{th}$ generation (6G) communication system.

Figure 1:
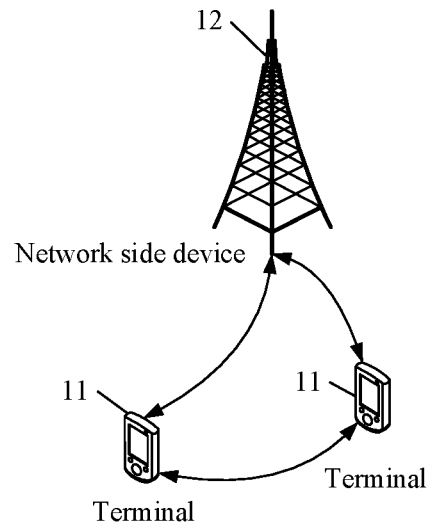
FIG. 1 is a structural diagram of a network system to which an embodiment of this application is applicable.

FIG. 1 is a block diagram of a wireless communication system to which an embodiment of this application is applicable. The wireless communication system includes a terminal 11 and a network side device 12. The terminal 11 may also be referred to as a terminal device or user equipment (UE). The terminal 11 may be a terminal-side device such as a mobile phone, a tablet personal computer (Tablet Personal Computer), a laptop computer (Laptop Computer) or a notebook computer, a personal digital assistant (PDA), a palmtop computer, a netbook, an ultra-mobile personal computer (UMPC), a mobile Internet device (MID), a wearable device (Wearable Device) or vehicle user equipment (VUE), pedestrian user equipment (PUE), and the like. The wearable device includes: a bracelet, a headphone, glasses, and the like. It needs to be noted that, the embodiments of this application do not limit a specific type of the terminal 11. The network side device 12 may be a base station or a core network. The base station may be referred to as a node B, an evolved node B, an access point, a base transceiver station (BTS), a radio base station, a radio transceiver, a basic service set (BSS), an extended service set (ESS), a node B, an evolved node B (eNB), a home node B, a home evolved node B, a WLAN access point, a WiFi node, a transmitting receiving point (TRP), or some another suitable term in the described art. As long as the same technical effect is achieved, the base station is not limited to a specific technical term. It needs to be noted that, in the embodiments of this application, only a base station in the NR system is used as an example, but a specific type of the base station is not limited.

The following describes the channel monitoring method provided in the embodiments of this application in detail through specific embodiments and application scenarios thereof with reference to the accompanying drawings.

Figure 2:
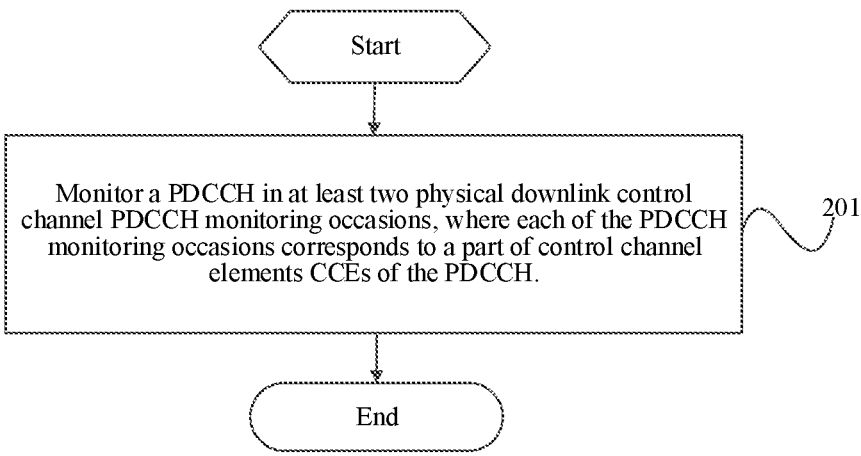
FIG. 2 is a schematic flowchart of a channel monitoring method according to an embodiment of this application.

As shown in FIG. 2, according to an embodiment of this application, a channel monitoring method is provided, and applied to a terminal. The method includes:

Step 201. Monitor a PDCCH in at least two physical downlink control channel (PDCCH) monitoring occasions, where, each of the PDCCH monitoring occasions corresponds to a part of control channel elements (CCEs) of the PDCCH. That is, each of the PDCCH monitoring occasions transmits the part of CCEs of the PDCCH.

Each of the PDCCH monitoring occasions corresponds to the part of CCEs of the PDCCH. CCEs corresponding to the at least two PDCCH monitoring occasions are combined to form a complete PDCCH, or a quantity of CCEs corresponding to each of the PDCCH monitoring occasions is less than a quantity of CCEs corresponding to an aggregation level of the PDCCH.

The aggregation level of the PDCCH is configured by a network device. Preferably, the aggregation level of the PDCCH is greater than or equal to a preset threshold, for example, the preset threshold is 16.

Figure 3:
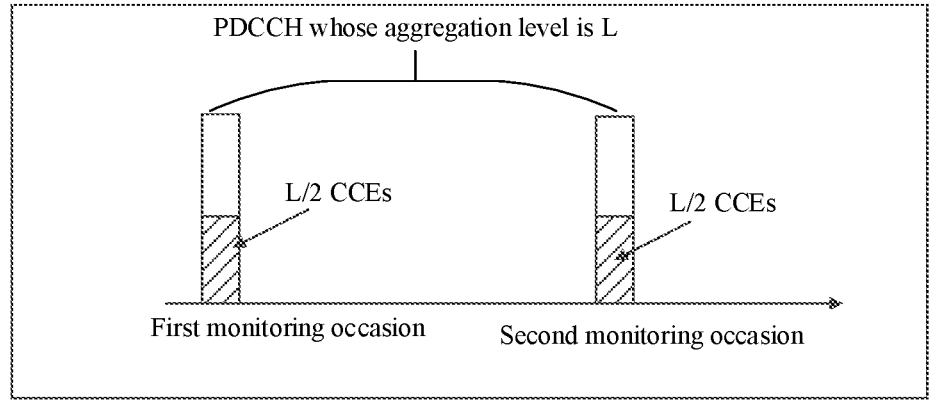
FIG. 3 is a schematic diagram of a relationship between a PDCCH monitoring occasion and a CCE according to an embodiment of this application.
Figure 4:
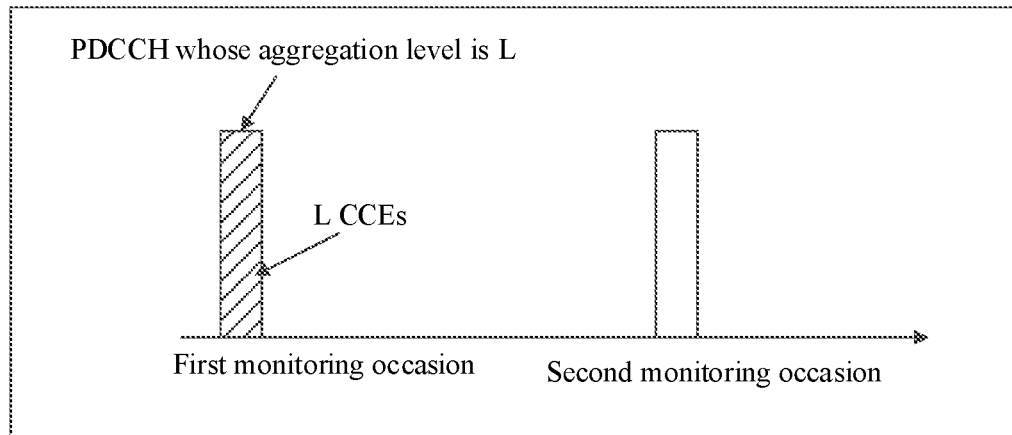
FIG. 4 is a schematic diagram of a relationship between a PDCCH monitoring occasion and a CCE in the prior art.

For example, if the aggregation level of the PDCCH is L, that is, the PDCCH includes L CCEs, and each monitoring occasion of a plurality of PDCCH monitoring occasions transmits a part of CCEs in the L CCEs. As shown in FIG. 3, the L CCEs are distributed in 2 monitoring occasions, and each monitoring occasion corresponds to L/2 CCEs. That is, all information of the PDCCH is transmitted through CCEs in the two monitoring occasions. In the prior art, as shown in FIG. 4, the L CCEs are transmitted in one PDCCH monitoring occasion. That is, the L CCEs in one PDCCH monitoring occasion transmit all information of the PDCCH. Therefore, according to the embodiments of this application, the terminal can achieve joint detection for the PDCCH based on a plurality of PDCCH monitoring occasions because each of the PDCCH monitoring occasions corresponds to a part of CCEs of the PDCCH. Optionally, the at least two PDCCH monitoring occasions belong to a same control resource set (CORESET) or belong to different control resource sets.

Alternatively, the at least two PDCCH monitoring occasions belong to a same search space set (SS Set) or belong to different search space sets.

In a case that the at least two PDCCH monitoring occasions belong to the different control resource sets, at least one of the following parameters of the at least two PDCCH monitoring occasions is the same:

a resource element group bundle size (REG bundle size);
an interleave size (Interleave size);
a precoding granularity;
a total quantity of CCEs of the control resource sets;
a quantity of resource blocks of the control resource sets; or
a quantity of symbols of the control resource sets.

According to the channel monitoring method in the embodiments of this application, a PDCCH is monitored in at least two physical downlink control channel (PDCCH) monitoring occasions, and each of the PDCCH monitoring occasions corresponds to a part of control channel elements (CCEs) of the PDCCH, so that a terminal can achieve joint detection for the PDCCH based on a plurality of PDCCH monitoring occasions, which improves transmission performance of the PDCCH.

Optionally, an index of a resource corresponding to information carried by the CCE in each of the PDCCH monitoring occasions is the same.

That is, the CCE is distributed at a same position of each of the PDCCH monitoring occasions.

Optionally, indexes of resources corresponding to the CCEs in each of the PDCCH monitoring occasions are determined according to a number of the PDCCH monitoring occasion.

For example, an offset value of a start position of information carried by a CCE transmitted by a $j^{th}$ PDCCH monitoring occasion is related to j.

Further optionally, the number of the PDCCH monitoring occasion is determined according to at least one of the following:
an order of time;
an order of frequency;
a serving cell index;
a control resource set index; or
a search space set index.

For example, a plurality of PDCCH monitoring occasions number the PDCCH in an order of time from front to back at different time; or a plurality of PDCCH monitoring occasions are sorted in an order of serving cell indexes from small to large or from large to small in different serving cells; or a plurality of different frequencies at the same time are numbered in an order of frequencies from low to high or from high to low; or a plurality of PDCCH monitoring occasions are numbered in an order of CORESET indexes from large to small or from small to large in different CORESETs.

Optionally, before monitoring of a PDCCH is performed in at least two physical downlink control channel (PDCCH) monitoring occasions, the method further includes:
determining a quantity of the CCEs corresponding to each of the PDCCH monitoring occasions.

In the embodiment of this application, the quantity of the CCEs corresponding to each of the PCCH monitoring occasions may be equal or different.

When the quantity of the CCEs corresponding to each of the PDCCH monitoring occasions is the same, the determining a quantity of the CCEs corresponding to each of the PDCCH monitoring occasions includes:
determining the quantity of the CCEs corresponding to each of the PDCCH monitoring occasions according to an aggregation level of the PDCCH and a quantity of the PDCCH monitoring occasions.

For example, if an aggregation level of a transmitted PDCCH is L and the transmitted PDCCH is monitored in N PDCCH monitoring occasions, a quantity of CCEs corresponding to each of the PDCCH monitoring occasions is L/N.

When the quantity of the CCEs corresponding to each of the PDCCH monitoring occasions is different, the determining the quantity of the CCEs corresponding to each of the PDCCH monitoring occasions includes:
determining the quantity of the CCEs corresponding to each of the PDCCH monitoring occasions according to an indication of a network setting or according to a preset quantity of the CCEs. That is, the quantity of the CCEs corresponding to each of the PDCCH monitoring occasions is preset or indicated by a network device.

In an embodiment of this application, assuming that an aggregation level of a PDCCH is L, i.e. L CCEs are required for PDCCH transmission, the network device may configure the L CCEs to be distributed in a plurality of PDCCH MOs (i.e. the L CCEs are transmitted in the plurality of PDCCH MOs). For example, the L CCEs are distributed in 2 PDCCH MOs, and L/2 CCEs are transmitted in each PDCCH MO. The plurality of PDCCH MOs may be indicated by a network, and a plurality of MOs may belong to a same CORESET or different CORESETs, and belong to a same search space set or different search space sets. UE monitors the PDCCH in a plurality of PDCCH MOs indicated by the network.

A plurality of CCE portions of the PDCCH are transmitted in different PDCCH MOs, and an index of a resource corresponding to a CCE in each PDCCH MO is the same, or a start position corresponding to a CCE in each PDCCH MO has a definite mapping position relationship with the PDCCH MO. A definite mapping position relationship is that: a number of a CCE is associated with a number of a PDCCH MO. For example, $$L \cdot \left\{ \left( Y_{p,n_{s,f}^\mu} + \left\lfloor \frac{m_{s,n_{CI}} \cdot N_{CCE,p}}{L \cdot M_{s,max}^{(L)}} \right\rfloor + n_{CI} + f(mo\_idx) \right) \bmod \lfloor N_{CCE,p}/L \rfloor \right\} + i.$$

For any common search space (Common Search Space, CSS), $Y_{p,n_{s,f}^\mu}=0$. For a UE specific search space (UE Specific Search Space, USS), $Y_{p,n_{s,f}^\mu}=(A_p \cdot Y_{p,n_{s,f}^\mu-1}) \bmod D$. When $Y_{p,-1}=n_{RNTI} \neq 0$, p mod 3=0, $A_p$=39827. When p mod 3=1, $A_p$=39829. When p mod 3=2, $A_p$=39839; D=65537; i=0, . . . , L−1, and L represents an aggregation level.

$N_{CCE,p}$ is a quantity of CCEs, and is numbered in an order from 0 to $N_{CCE,p}-1$ in a CORESET p (a CORESET numbered p). $n_{RNTI}$ is a cell radio network temporary identifier C-RNTI.

If high-layer signaling configures a carrier indicator field to a serving cell that the PDCCH monitors, $n_{CI}$ is a value of the carrier indicator field, otherwise, for any CSS, $n_{CI}$=0.

$m_{s,n_{CI}}=0, \ldots, M_{s,n_{CI}}^{(L)}-1$, $M_{s,n_{CI}}^{(L)}$ is a quantity of candidate PDCCHs whose aggregation levels are L that UE is configured to monitor in an SS set s of a serving cell corresponding to $n_{CI}$.

For any CSS, $M_{s,max}^{(L)}=M_{s,0}^{(L)}$. For a USS, $M_{s,max}^{(L)}$ is a maximum value in $M_{s,n_{CI}}^{(L)}$ corresponding to all configured $n_{CI}$ values.

f(mo_idx)=mo_idx*N, N is a positive integer, and mo_idx represents an index of a monitoring occasion MO.

Through the foregoing formula, the UE can determine a resource transmitted by a part of CCEs of the PDCCH in different monitoring occasions, and then joint PDCCH detection can be performed on the CCEs in different monitoring occasions together, which avoids a plurality of attempts that the UE needs to combine a plurality of different PDCCH monitoring occasions to perform joint detection in pairs.

Optionally, transmission configuration indicator (TCI) states corresponding to different PDCCH monitoring occasions are the same or different.

TCI states corresponding to the at least two PDCCH monitoring occasions are one or more TCI states configured by a network device;

or, TCI states corresponding to the at least two PDCCH monitoring occasions are one or more TCI states activated by a media access layer control element (MAC-CE).

In the embodiment of this application, for PDCCH monitoring on a plurality of PDCCH MOs, the UE can use different TCI states (state) to monitor in different PDCCH MOs. If the plurality of PDCCH MOs belong to a same CORESET, a network can use RRC signaling or MAC-CE to indicate a plurality of TCI states, and the UE uses corresponding TCI states on the plurality of PDCCH MOs to monitor the PDCCH in a circular order according to an order of the PDCCH MOs and numbers of the TCI states.

For example, if the network is configured to monitor the PDCCH on two PDCCH MOs, and each PDCCH MO transmits L/2 CCEs of a PDCCH whose aggregation level is L, and the network indicates two TCI states whose indexes are n1 and n2 through RRC or MAC-CE, the UE respectively uses TCI states n1 and n2 to monitor on the two PDCCH MOs.

Alternatively, if the network is configured to monitor the PDCCH on four PDCCH MOs, and each PDCCH MO transmits L/4 CCEs of a PDCCH whose aggregation level is L, and the network indicates two TCI states whose indexes are n1 and n2 through RRC or MAC-CE, the UE respectively uses TCI states n1, n2, n1, and n2 to monitor on the four PDCCH MOs.

Optionally, the monitoring a PDCCH in at least two physical downlink control channel (PDCCH) monitoring occasions includes:

monitoring, in a case that a blind detection capability corresponding to PDCCH monitoring in a preset period configured by a network device is greater than a PDCCH blind detection capability of the terminal on a current serving cell, a first PDCCH or a second PDCCH preferentially in each of the PDCCH monitoring occasions, where, the blind detection capability includes a quantity of blind detection times in the preset period and a quantity of non-overlapping CCEs in the preset period, the first PDCCH is a PDCCH configured with N monitoring resources for joint detection, the second PDCCH is a PDCCH other than the first PDCCH, and N is a positive integer greater than 1.

A priority of the first PDCCH is determined according to N, for example, the larger N is, the higher the priority is, or the smaller N is, the higher the priority is. That is, in a case that there are a plurality of first PDCCHs, detection priorities of the plurality of first PDCCHs are determined according to a size of N.

In a specific embodiment of this application, PDCCH blind detection capability of the UE on each serving cell (serving cell) includes a maximum quantity of blind detection times and a maximum quantity of non-overlapping CCEs. However, the network may actually configure PDCCH detection for a period of time (one or more slots or symbols) resulting in a case that a quantity of blind detection times or a quantity of non-overlapping CCEs is greater than the blind detection capability of the UE. Thus, the UE needs to discard PDCCH monitoring in an SS set in which an index value of a USS is relatively higher.

In a case that it is introduced that PDCCH detection is performed in a plurality of PDCCH MOs, and each PDCCH MO transmits only a part of CCEs of the PDCCH, a rule of discarding monitoring of the PDCCH can be further optimized.

For example, in each PDCCH MO, the UE preferentially detects a part of PDCCHs configured with N PDCCH MOs (N>1) for joint detection. In this way, performance of UE PDCCH detection can be ensured. If a value of N is larger, a priority thereof is higher, and if the value of N is smaller, the priority thereof is lower. Generally, this solution is more suitable in a case that the part of the CCEs of the PDCCH transmitted by each PDCCH MO cannot be decoded correctly.

Alternatively, the UE preferentially detects PDCCH other than PDCCH configured with N PDCCH MOs for joint detection. For example, when the PDCCH MO is an MO other than a first PDCCH MO in the N PDCCH MOs, a priority of such PDCCH monitoring transmitted partially may be lowered. That is, it is considered that a priority of a PDCCH that has undergone partial CCE detection is lowered. This solution requires that a PDCCH of a part of CCEs transmitted by the first PDCCH MO is a PDCCH that can be correctly decoded. If it needs to monitor a plurality of PDCCHs with different N values in a same PDCCH MO, the smaller the N value is, the higher the priority is.

The higher priority indicates that a detected PDCCH is given priority or a PDCCH discarding detection is not given priority in a process of determining whether a PDCCH in a corresponding search space set is detected/discarded.

Optionally, the channel monitoring method according to the embodiments of this application further includes:

determining a terminal behavior indicated by the PDCCH according to a time unit in which a last PDCCH monitoring occasion in the at least two PDCCH monitoring occasions is located, where the terminal behavior includes at least one of the following:

determining a time resource for sending of a physical uplink shared channel (PUSCH) or a time resource for receiving of a PDSCH according to time domain resource allocation (TDRA) indicated by the PDCCH;

determining, according to a PDCCH indication, a time resource for transmitting a physical uplink control channel (PUCCH) fed back by a hybrid automatic repeat request acknowledgment (HARQ-ACK);

bandwidth part (BWP) switching time;

BWP switching delay;

starting or restarting a discontinuous reception inactivity timer;

an effective time of a minimum K0, where K0 is a slot offset between a PDCCH for transmitting PDSCH scheduling information and a scheduled PDSCH;

an effective time of a minimum K2, where K2 is a slot offset between a PDCCH for transmitting PUSCH scheduling information and a scheduled PUSCH;

an effective time of search space set switching; or indicating a slot resource at which a channel state information reference signal (CSI-RS) for reporting of aperiodic channel state information (CSI) is located.

In the embodiment of this application, in a case that the network is configured to perform PDCCH transmission on a plurality of MOs, where each of the MOs transmits only a part of the CCEs of the PDCCH, a UE behavior indicated by the PDCCH is determined according to a last MO of the plurality of MOs as a reference time.

If the PDCCH is configured to schedule PDSCH reception or PUSCH transmission, a corresponding time of receiving or sending uses a time resource of a last PDCCH MO as the reference time, and a symbol received or sent by the PDSCH or PUSCH is determined according to scheduling information indicated by the PDCCH.

Similarly, if the PDCCH triggers aperiodic CSI reporting, a corresponding CSI-RS resource is determined according to a last PDCCH MO of the plurality of PDCCH MOs, usually at a slot at which the last PDCCH MO is located, or at a slot determined according to a time offset configured by the network.

For some non-scheduled PDCCHs, for example, a PDCCH indicating semi-persistent scheduling PDSCH release, the UE determines a PUCCH resource fed back by an HARQ-ACK according to an indication of an end symbol of the PDCCH and an HARQ-ACK time resource in the PDCCH. When the network is configured to transmit the PDCCH in the plurality of PDCCH MOs, and a part of CCEs of the PDCCH is monitored in each PDCCH MO, the UE determines a time resource fed back by the HARQ-ACK according to the last PDCCH MO.

For a bandwidth part indicator field (bandwidth part indicator field) included in the PDCCH, if a BWP different from a current active BWP is indicated, the UE switches to a new BWP. If the network configures the UE to monitor the PDCCH on the plurality of PDCCH MOs, a part of CCEs of the PDCCH is monitored in each PDCCH MO. Then after detecting any PDCCH in N PDCCH MOs, the UE performs BWP switching in a reference PDCCH MO, i.e. starts or restarts a bandwidth part inactivity timer (Bwp Inactivity-Timer) from a subframe or slot at which the reference PDCCH MO is located.

For a time point when the UE starts to perform BWP switching, or when the bwpInactivityTimer is started or restarted, the reference PDCCH MO of the foregoing PDCCH MO can be used as a reference time point, and can be the following information of the reference PDCCH MO:
  a start symbol, end, a next symbol of end; and
  a located slot, subframe, or a next slot or a next subframe.
  The reference PDCCH MO may be:
  a last MO in N PDCCH MOs;
  a last valid MO in N PDCCH MOs; and
  after the foregoing reference time point T1, the UE completes the BWP switching, and a duration of T1 depends on UE capability.

Similarly, for a PDCCH indicating the following functions:
  starting or restarting a discontinuous reception inactivity timer (drx InactivityTimer), an effective time is T2;
  an effective time of Minimum K0 and K2 is T3;
  an effective time of search space set switching is T4; and
  if the PDCCH is monitored in a plurality of PDCCH MOs, and only a part of the CCEs of the PDCCH is monitored in each PDCCH MO. A reference time of the effective time is a last MO in the plurality of PDCCH MOs.

According to the channel monitoring method in the embodiments of this application, by supporting monitoring the PDCCH in the plurality of monitoring occasions, each monitoring occasion corresponds to a part of CCEs of the PDCCH, so that reliability of PDCCH transmission can be improved, and flexibility of network resource allocation can also be improved.

Figure 5:
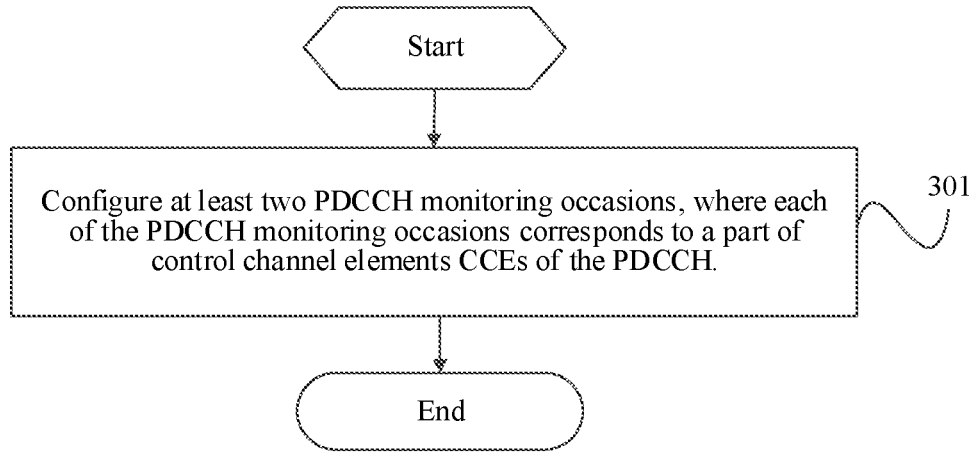
FIG. 5 is a schematic flowchart of a channel transmission method according to an embodiment of this application.

As shown in FIG. 5, the embodiments of this application further provide a channel transmission method, applied to a network side device, the method including:
  Step 301. Configure at least two PDCCH monitoring occasions;
    where, each of the PDCCH monitoring occasions corresponds to a part of control channel elements (CCEs) of the PDCCH.

According to the channel transmission method in the embodiments of this application, at least two PDCCH monitoring occasions are configured, and each of the PDCCH monitoring occasions corresponds to a part of control channel elements (CCEs) of the PDCCH, so that a terminal can achieve joint detection for the PDCCH based on a plurality of PDCCH monitoring occasions, which improves transmission performance of the PDCCH.

Optionally, indexes of resources corresponding to the CCEs in each of the PDCCH monitoring occasions are the same.

Optionally, indexes of resources corresponding to the CCEs in each of the PDCCH monitoring occasions are determined according to a number of the PDCCH monitoring occasion.

Optionally, the number of the PDCCH monitoring occasion is determined according to at least one of the following:
  an order of time;
  an order of frequency;
  a serving cell index;
  a control resource set index; or
  a search space set index.

Optionally, the channel transmission method according to the embodiments of this application further includes:
  indicating a quantity of the CCEs corresponding to each of the PDCCH monitoring occasions to a terminal.

Optionally, the channel transmission method according to the embodiments of this application further includes:
  configuring TCI states corresponding to the at least two PDCCH monitoring occasions.

According to the channel transmission method in the embodiments of this application, at least two PDCCH monitoring occasions are configured, and each of the PDCCH monitoring occasions corresponds to a part of control channel elements (CCEs) of the PDCCH, so that a terminal can achieve joint detection for the PDCCH based on a plurality of PDCCH monitoring occasions, which improves transmission performance of the PDCCH.

It needs to be noted that, the channel monitoring method provided in the embodiments of this application may be performed by a channel monitoring apparatus or a control module included in the channel monitoring apparatus and configured to perform the channel monitoring method. In the embodiments of this application, for example, the channel monitoring apparatus provided in the embodiments of this application is described by using an example in which the channel monitoring method is performed by the channel monitoring apparatus.

Figure 6:
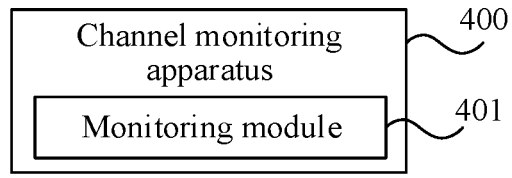
FIG. 6 is a schematic diagram of modules of a channel monitoring apparatus according to an embodiment of this application.

As shown in FIG. 6, according to an embodiment of this application, a channel monitoring apparatus 400 is further provided, and applied to a terminal. The apparatus includes:
  a monitoring module 401, configured to monitor a PDCCH in at least two physical downlink control channel (PDCCH) monitoring occasions;
  where, each of the PDCCH monitoring occasions corresponds to a part of control channel elements (CCEs) of the PDCCH.

According to the channel monitoring apparatus provided in the embodiments of this application, indexes of resources corresponding to the CCEs in each of the PDCCH monitoring occasions are the same.

According to the channel monitoring apparatus provided in the embodiments of this application, indexes of resources corresponding to the CCEs in each of the PDCCH monitoring occasions are determined according to a number of the PDCCH monitoring occasion.

According to the channel monitoring apparatus provided in the embodiments of this application, the number of the PDCCH monitoring occasion is determined according to at least one of the following:
- an order of time;
- an order of frequency;
- a serving cell index;
- a control resource set index; or
- a search space set index.

The channel monitoring apparatus provided in the embodiments of this application further includes:
- a first determining module, configured to determine a quantity of the CCEs corresponding to each of the PDCCH monitoring occasions before the monitoring module monitors the PDCCH in at least two physical downlink control channel (PDCCH) monitoring occasions.

According to the channel monitoring apparatus provided in the embodiments of this application, the first determining module determines the quantity of the CCEs corresponding to each of the PDCCH monitoring occasions according to an aggregation level of the PDCCH and a quantity of the PDCCH monitoring occasions;
- or, determines the quantity of the CCEs corresponding to each of the PDCCH monitoring occasions according to an indication of a network setting or according to a preset quantity of the CCEs.

According to the channel monitoring apparatus provided in the embodiments of this application, transmission configuration indicator (TCI) states corresponding to different PDCCH monitoring occasions are the same or different.

According to the channel monitoring apparatus provided in the embodiments of this application, TCI states corresponding to the at least two PDCCH monitoring occasions are one or more TCI states configured by a network device;
- or, TCI states corresponding to the at least two PDCCH monitoring occasions are one or more TCI states activated by a media access layer control element (MAC-CE).

According to the channel monitoring apparatus provided in the embodiments of this application, the monitoring module is configured to monitor, in a case that a blind detection capability corresponding to PDCCH monitoring in a preset period configured by a network device is greater than a PDCCH blind detection capability of the terminal on a current serving cell, a first PDCCH or a second PDCCH preferentially in each of the PDCCH monitoring occasions;
- where, the blind detection capability includes a quantity of blind detection times in the preset period and a quantity of non-overlapping CCEs in the preset period, the first PDCCH is a PDCCH configured with N monitoring resources for joint detection, the second PDCCH is a PDCCH other than the first PDCCH, and N is a positive integer greater than 1.

According to the channel monitoring apparatus provided in the embodiments of this application, a priority of the first PDCCH is determined according to N.

The channel monitoring apparatus provided in the embodiments of this application further includes:
- a second determining module, configured to determine a terminal behavior indicated by the PDCCH according to a time unit in which a last PDCCH monitoring occasion in the at least two PDCCH monitoring occasions is located; where the terminal behavior includes at least one of the following:
  - determining a time resource for sending of a physical uplink shared channel (PUSCH) or a time resource for receiving of a PDSCH according to time domain resource allocation (TDRA) indicated by the PDCCH;
  - determining, according to a PDCCH indication, a time resource for transmitting a physical uplink control channel (PUCCH) fed back by a hybrid automatic repeat request acknowledgment (HARQ-ACK);
  - bandwidth part (BWP) switching time;
  - BWP switching delay;
  - starting or restarting a discontinuous reception inactivity timer;
  - an effective time of a minimum K0, where K0 is a slot offset between a PDCCH for transmitting PDSCH scheduling information and a scheduled PDSCH;
  - an effective time of a minimum K2, where K2 is a slot offset between a PDCCH for transmitting PUSCH scheduling information and a scheduled PUSCH;
  - an effective time of search space set switching; or
  - indicating a slot resource at which a channel state information reference signal (CSI-RS) for reporting of aperiodic channel state information (CSI) is located.

According to the channel monitoring apparatus provided in the embodiments of this application, the at least two PDCCH monitoring occasions belong to a same control resource set or belong to different control resource sets;
- or the at least two PDCCH monitoring occasions belong to a same search space set or belong to different search space sets.

According to the channel monitoring apparatus provided in the embodiments of this application, in a case that the at least two PDCCH monitoring occasions belong to the different control resource sets, at least one of the following parameters of the at least two PDCCH monitoring occasions is the same:
- a resource element group (REG) bundle size;
- an interleave size;
- a precoding granularity;
- a total quantity of CCEs of the control resource sets;
- a quantity of resource blocks of the control resource sets; or
- a quantity of symbols of the control resource sets.

According to the channel monitoring apparatus in the embodiments of this application, a PDCCH is monitored in at least two physical downlink control channel (PDCCH) monitoring occasions, and each of the PDCCH monitoring occasions corresponds to a part of control channel elements (CCEs) of the PDCCH, so that a terminal can achieve joint detection for the PDCCH based on a plurality of PDCCH monitoring occasions, which improves transmission performance of the PDCCH.

The channel monitoring apparatus in the embodiments of this application may be an apparatus, or a component, an integrated circuit, or a chip in a terminal. The apparatus may be a mobile terminal or a non-mobile terminal. Exemplarily, the mobile terminal may include, but is not limited to, types of the terminal 11 listed above, and the non-mobile terminal may be a server, a network attached storage (NAS), a personal computer (PC), a television (TV), an automated teller machine, or a self-service machine. This is not specifically limited in the embodiments of this application.

The channel monitoring apparatus in the embodiments of this application may be an apparatus with an operating system. The operating system may be an Android (Android) operating system, or may be an iOS operating system or other possible operating systems, which is not specifically limited in the embodiments of this application.

The channel monitoring apparatus provided in the embodiments of this application can implement each process implemented by a method embodiment of FIG. 1 to FIG. 2 and achieve the same technical effect. To avoid repetition, details are not described herein again.

Figure 7:
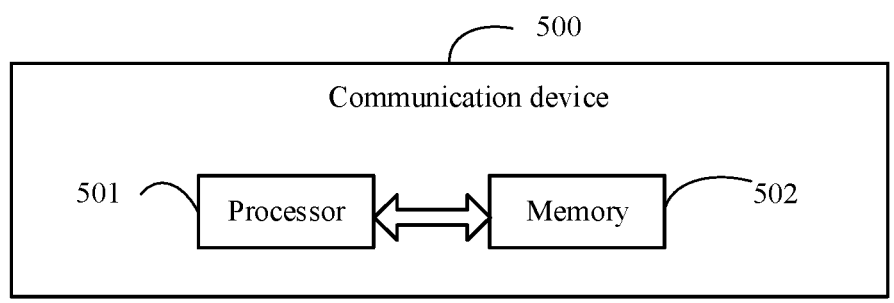
FIG. 7 is a structural block diagram of a communication device according to an embodiment of this application.

Optionally, as shown in FIG. 7, the embodiments of this application further provide a communication device 500, including a processor 501, a memory 502, and a program or an instruction stored in the memory 502 and executable on the processor 501. For example, when the communication device 500 is a terminal, the program or instruction is executed by the processor 501 to implement processes of the foregoing embodiments of the channel monitoring method applicable to the terminal, and the same technical effect can be achieved. When the communication device 500 is a network side device, the program or instruction is executed by the processor 501 to implement processes of the foregoing embodiments of the channel monitoring method applicable to the network side device, and the same technical effect can be achieved. To avoid repetition, details are not described herein again.

Figure 8:
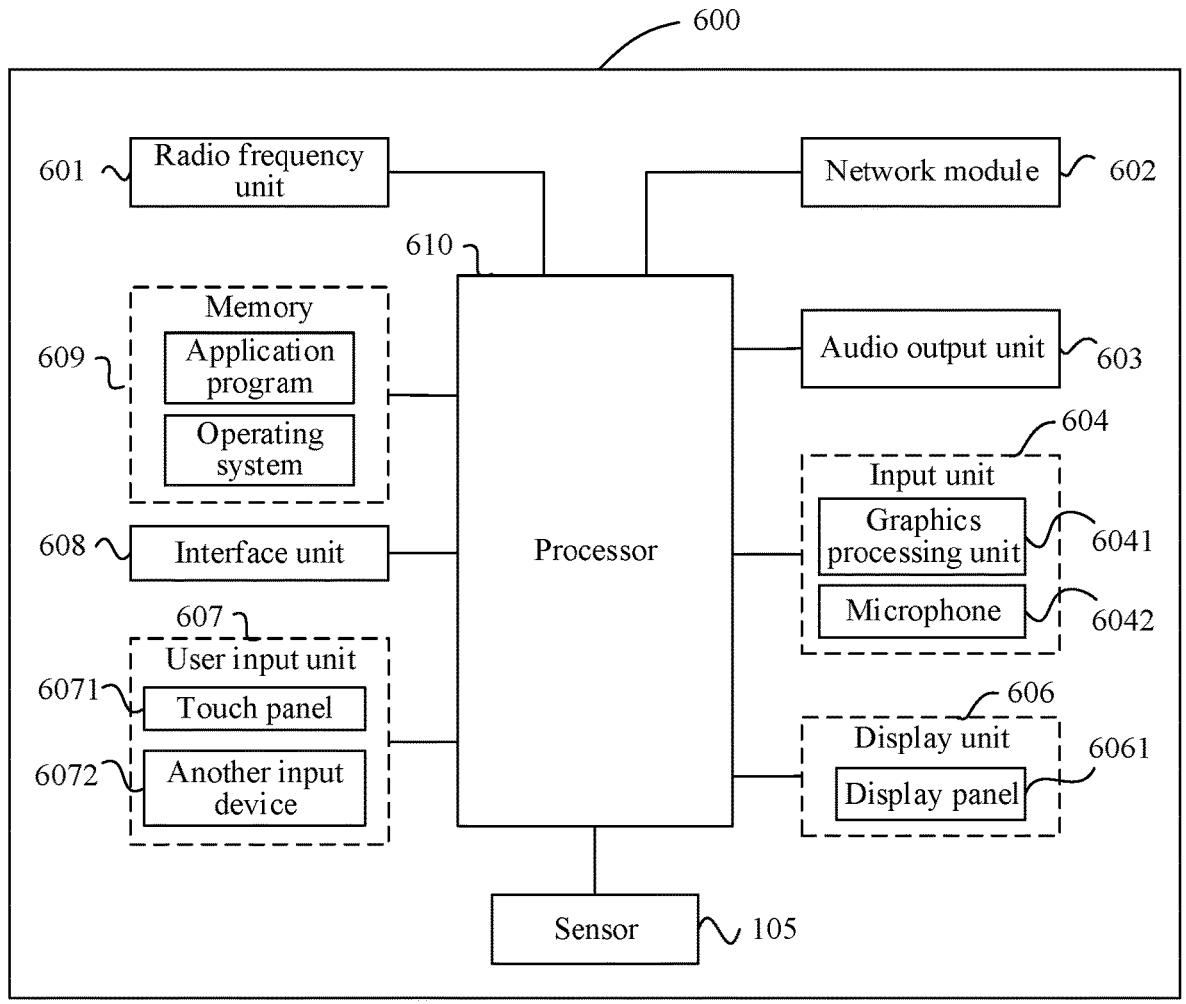
FIG. 8 is a structural block diagram of a terminal according to an embodiment of this application.

FIG. 8 is a schematic structural diagram of hardware of a terminal implementing an embodiment of this application.

The terminal 600 includes, but is not limited to: components such as a radio frequency unit 601, a network module 602, an audio output unit 603, an input unit 604, a sensor 605, a display unit 606, a user input unit 607, an interface unit 608, a memory 609, and a processor 610.

Those skilled in the art may understand that the terminal 600 may further include a power supply (such as a battery) for supplying power to the components. The power supply may logically connect to the processor 610 by using a power supply management system, thereby implementing functions such as charging, discharging, and power consumption management, by using the power supply management system. A terminal structure shown in FIG. 6 does not constitute a limitation to the terminal, and the terminal may include more or fewer components than those shown in the figure, or some components may be combined, or a different component deployment may be used. Details are not described herein again.

It should be understood that in the embodiments of this application, the input unit 604 may include a graphics processing unit (GPU) 6041 and a microphone 6042, and the graphics processing unit 6041 processes image data of a still picture or a video obtained by an image capture apparatus (such as a camera) in a video capture mode or an image capture mode. The display unit 606 may include a display panel 6061. The display panel 6061 may be configured by using a liquid crystal display, an organic light-emitting diode, or the like. The user input unit 607 includes a touch panel 6071 and another input device 6072. The touch panel 6071 is also referred to as a touch screen. The touch panel 6071 may include two parts: a touch detection apparatus and a touch controller. The another input device 6072 may include, but is not limited to, a physical keyboard, a functional key (for example, a volume control key or a switch key), a track ball, a mouse, and a joystick, and the details will not be described herein again.

In the embodiments of this application, the radio frequency unit 601 is configured to receive downlink data from a network side device and transmit the downlink data to the processor 610 for processing; and send uplink data to the network side device. Generally, the radio frequency unit 601 includes, but is not limited to, an antenna, at least one amplifier, a transceiver, a coupler, a low noise amplifier, a duplexer, and the like.

The memory 609 may be configured to store a software program or instruction and various data. The memory 609 may mainly include a program or instruction storage area and a data storage area. The program or instruction storage area may store an operating system, an application program or instruction required by at least one function (for example, a sound playback function and an image display function), and the like. In addition, the memory 609 may include a high-speed random access memory and may also include a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The memory 609 may include, for example, at least one magnetic disk memory device, a flash memory device, or other non-volatile solid-state memory devices.

The processor 610 may include one or more processing units. Optionally, the processor 610 may integrate an application processor and a modem processor, where the application processor mainly processes an operating system, a user interface, an application program or instruction, and the like, and the modem processor mainly processes wireless communication, such as a baseband processor. It may be understood that the modem processor may alternatively not be integrated into the processor 610.

The processor 610 is configured to monitor a PDCCH in at least two physical downlink control channel (PDCCH) monitoring occasions;
  where, each of the PDCCH monitoring occasions corresponds to a part of control channel elements (CCEs) of the PDCCH.

According to the terminal in the embodiments of this application, a PDCCH is monitored in at least two physical downlink control channel (PDCCH) monitoring occasions, and each of the PDCCH monitoring occasions corresponds to a part of control channel elements (CCEs) of the PDCCH, so that a terminal can achieve joint detection for the PDCCH based on a plurality of PDCCH monitoring occasions, which improves transmission performance of the PDCCH.

Optionally, indexes of resources corresponding to the CCEs in each of the PDCCH monitoring occasions are the same.

Optionally, indexes of resources corresponding to the CCEs in each of the PDCCH monitoring occasions are determined according to a number of the PDCCH monitoring occasion.

Optionally, the number of the PDCCH monitoring occasion is determined according to at least one of the following:
  an order of time;
  an order of frequency;
  a serving cell index;
  a control resource set index; or
  a search space set index.

Optionally, the PDCCH monitoring occasion transmits information carried by a first quantity of CCEs of the PDCCH. The processor 610 is further configured to determine a quantity of the CCEs corresponding to each of the PDCCH monitoring occasions.

Optionally, the processor 610 is further configured to determine the quantity of the CCEs corresponding to each of the PDCCH monitoring occasions according to an aggregation level of the PDCCH and a quantity of the PDCCH monitoring occasions;
  or, determine the quantity of the CCEs corresponding to each of the PDCCH monitoring occasions according to an indication of a network setting or according to a preset quantity of the CCEs.

Optionally, transmission configuration indicator (TCI) states corresponding to different PDCCH monitoring occasions are the same or different.

Optionally, TCI states corresponding to the at least two PDCCH monitoring occasions are one or more TCI states configured by a network device;
   or, TCI states corresponding to the at least two PDCCH monitoring occasions are one or more TCI states activated by a media access layer control element (MAC-CE).

Optionally, the processor 610 is further configured to monitor, in a case that a blind detection capability corresponding to PDCCH monitoring in a preset period configured by a network device is greater than a PDCCH blind detection capability of the terminal on a current serving cell, a first PDCCH or a second PDCCH preferentially in each of the PDCCH monitoring occasions;
   where, the blind detection capability includes a quantity of blind detection times in the preset period and a quantity of non-overlapping CCEs in the preset period, the first PDCCH is a PDCCH configured with N monitoring resources for joint detection, the second PDCCH is a PDCCH other than the first PDCCH, and N is a positive integer greater than 1.

Optionally, a priority of the first PDCCH is determined according to N.

Optionally, the processor 610 is further configured to determine a terminal behavior indicated by the PDCCH according to a time unit in which a last PDCCH monitoring occasion in the at least two PDCCH monitoring occasions is located, where
   the terminal behavior includes at least one of the following:
   determining a time resource for sending of a physical uplink shared channel (PUSCH) or a time resource for receiving of a PDSCH according to time domain resource allocation (TDRA) indicated by the PDCCH;
   determining, according to a PDCCH indication, a time resource for transmitting a physical uplink control channel (PUCCH) fed back by a hybrid automatic repeat request acknowledgment (HARQ-ACK);
   bandwidth part (BWP) switching time;
   BWP switching delay;
   starting or restarting a discontinuous reception inactivity timer;
   an effective time of a minimum K0, where K0 is a slot offset between a PDCCH for transmitting PDSCH scheduling information and a scheduled PDSCH;
   an effective time of a minimum K2, where K2 is a slot offset between a PDCCH for transmitting PUSCH scheduling information and a scheduled PUSCH;
   an effective time of search space set switching; or
   indicating a slot resource at which a channel state information reference signal (CSI-RS) for reporting of aperiodic channel state information (CSI) is located.

Optionally, the at least two PDCCH monitoring occasions belong to a same control resource set or belong to different control resource sets;
   or the at least two PDCCH monitoring occasions belong to a same search space set or belong to different search space sets.

Optionally, in a case that the at least two PDCCH monitoring occasions belong to the different control resource sets, at least one of the following parameters of the at least two PDCCH monitoring occasions is the same:

a resource element group (REG) bundle size;
an interleave size;
a precoding granularity;
a total quantity of CCEs of the control resource sets;
a quantity of resource blocks of the control resource sets; or
a quantity of symbols of the control resource sets.

According to the terminal in the embodiments of this application, a PDCCH is monitored in at least two physical downlink control channel (PDCCH) monitoring occasions, and each of the PDCCH monitoring occasions corresponds to a part of control channel elements (CCEs) of the PDCCH, so that a terminal can achieve joint detection for the PDCCH based on a plurality of PDCCH monitoring occasions, which improves transmission performance of the PDCCH.

It needs to be noted that, the channel transmission method provided in the embodiments of this application may be performed by a channel transmission apparatus or a control module included in the channel transmission apparatus and configured to perform the channel transmission method. In the embodiments of this application, for example, the channel transmission apparatus provided in the embodiments of this application is described by using an example in which the channel transmission method is performed by the channel transmission apparatus.

Figure 9:
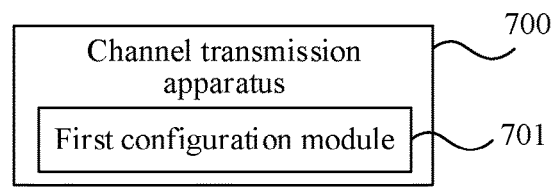
FIG. 9 is a schematic diagram of modules of a channel transmission apparatus according to an embodiment of this application.

As shown in FIG. 9, the embodiments of this application further provide a channel transmission apparatus 700, applied to a network side device, the method including:
   a first configuration module 701, configured to configure at least two PDCCH monitoring occasions;
   where, each of the PDCCH monitoring occasions corresponds to a part of control channel elements (CCEs) of the PDCCH.

According to the channel transmission apparatus provided in the embodiments of this application, indexes of resources corresponding to the CCEs in each of the PDCCH monitoring occasions are the same.

According to the channel transmission apparatus provided in the embodiments of this application, indexes of resources corresponding to the CCEs in each of the PDCCH monitoring occasions are determined according to a number of the PDCCH monitoring occasion.

According to the channel transmission apparatus provided in the embodiments of this application, the number of the PDCCH monitoring occasion is determined according to at least one of the following:
   an order of time;
   an order of frequency;
   a serving cell index;
   a control resource set index; or
   a search space set index.

The channel transmission apparatus provided in the embodiments of this application further includes:
   an indication module, configured to indicate a quantity of the CCEs corresponding to each of the PDCCH monitoring occasions to a terminal.

The channel transmission apparatus provided in the embodiments of this application further includes:
   a second configuration module, configured to configure TCI states corresponding to the at least two PDCCH monitoring occasions.

The channel transmission apparatus provided in the embodiments of this application can implement each process implemented by an embodiment of the channel transmission method applied to the network side device and achieve the same technical effect. To avoid repetition, details are not described herein again.

According to the channel transmission apparatus in the embodiments of this application, at least two PDCCH monitoring occasions are configured, and each of the PDCCH monitoring occasions corresponds to a part of control channel elements (CCEs) of the PDCCH, so that a terminal can achieve joint detection for the PDCCH based on a plurality of PDCCH monitoring occasions, which improves transmission performance of the PDCCH.

Figure 10:
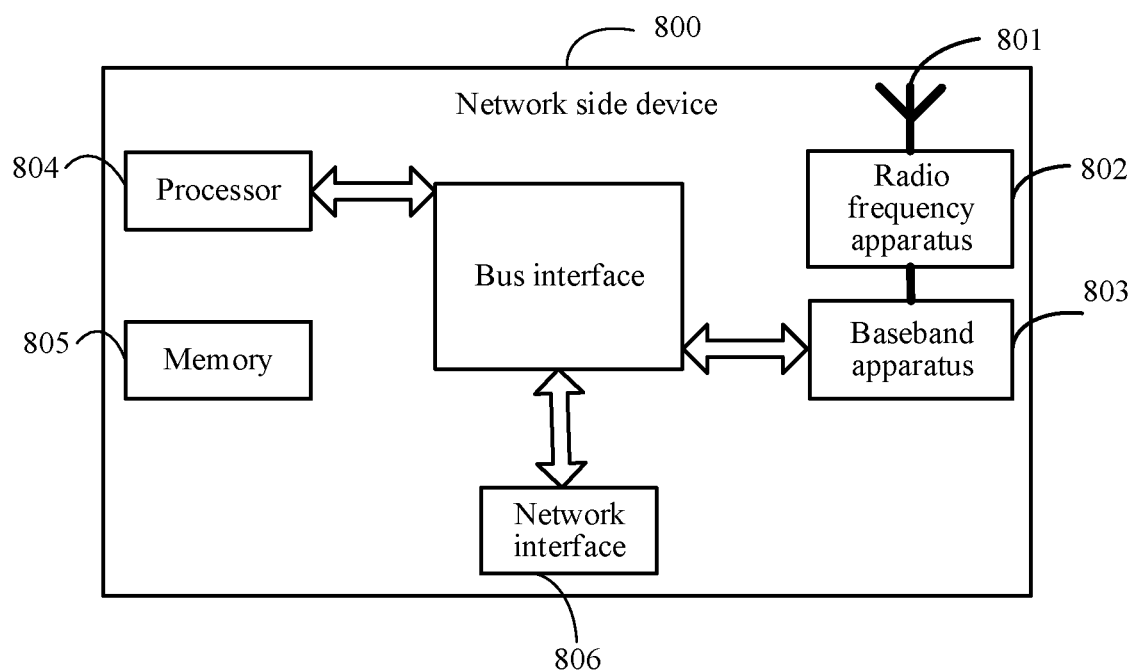
FIG. 10 is a structural block diagram of a network side device according to an embodiment of this application.

Specifically, an embodiment of this application further provides a network side device. As shown in FIG. 10, the network device 800 includes: an antenna 801, a radio frequency apparatus 802, and a baseband apparatus 803. The antenna 801 is connected to the radio frequency apparatus 802. In an uplink direction, the radio frequency apparatus 802 receives information through the antenna 801, and sends the received information to the baseband apparatus 803 for processing. In a downlink direction, the baseband apparatus 803 processes to-be-sent information, and sends the information to the radio frequency apparatus 802. The radio frequency apparatus 802 processes the received information and sends the information through the antenna 81.

The frequency band processing apparatus may be located in the baseband apparatus 803. The method performed by the network side device in the foregoing embodiments may be implemented in the baseband apparatus 803, and the baseband apparatus 803 includes a processor 804 and a memory 805.

The baseband apparatus 803 may include, for example, at least one baseband plate. A plurality of chips are disposed on the baseband plate. As shown in FIG. 8, one of the plurality of chips is, for example, the processor 804, and is connected to the memory 805, to invoke a program in the memory 805 to perform operations of the network device in the foregoing method embodiments.

The baseband apparatus 803 may further include a network interface 806, configured to exchange information with the radio frequency apparatus 802. The interface is, for example, a common public radio interface (CPRI).

Specifically, the network side device provided in the embodiments of the present disclosure further includes: an instruction or program stored in the memory 805 and executable on the processor 804. The processor 804 invokes the instruction or program in the memory 805 to perform the method performed by each module shown in FIG. 7 and achieve the same technical effect. To avoid repetition, details are not described herein again.

The embodiments of this application further provide a readable storage medium storing therein a program or an instruction. The program or instruction is executed by a processor to implement the processes of the embodiments of the foregoing channel monitoring method or the channel transmission method, and the same technical effects can be achieved. To avoid repetition, details are not described herein again.

The processor is a processor in the terminal in the foregoing embodiments. The readable storage medium includes a computer-readable storage medium, for example, a computer read-only memory (ROM), a random access memory (RAM), a magnetic disk, or an optical disc.

The embodiments of this application further provide a chip, including a processor and a communication interface. The communication interface is coupled to the processor, and the processor is configured to run a program or an instruction of a network side device to implement processes of the foregoing embodiments of the channel monitoring method or the channel transmission method, and the same technical effect can be achieved. To avoid repetition, details are not described herein again.

It should be noted that, the chip mentioned in the embodiments of this application may also be referred to as a system-level chip, a system chip, a chip system, a system on chip, or the like.

It may be understood that the embodiments described in the disclosure may be implemented by hardware, software, firmware, middleware, microcode, or a combination thereof. For hardware implementation, a module, a unit, a sub-module, and a sub-unit may be implemented in one or more application-specific integrated circuits (ASIC), a digital signal processor (DSP), a digital signal processing device (DSPD), a programmable logic device (PLD), a field-programmable gate array (FPGA), a general purpose processor, a controller, a micro-controller, a microprocessor, and other electronic units configured to execute the functions described in this application, or a combination of the above.

It needs to be noted that, terms "include", "comprise", and any variants thereof are intended to cover a non-exclusive inclusion. Therefore, in the context of a process, method, object, or apparatus that includes a series of elements, the process, method, object, or apparatus not only includes such elements, but also includes other elements not specified expressly, or may include inherent elements of the process, method, object, or apparatus. Without more limitations, elements defined by a sentence "including one" does not exclude that there are still other same elements in the process, method, object, or apparatus. Furthermore, it should be noted that a scope of the methods and apparatus in the embodiments of this application is not limited to performing the functions in the order shown or discussed, but may also include performing the functions in a substantially simultaneous manner or in the reverse order depending on the functions involved. For example, the methods described may be performed in an order different from that described, and various steps may also be added, omitted, or combined. In addition, features described with reference to some examples may be combined in other examples.

Through the descriptions of the foregoing implementations, a person skilled in the art may clearly understand that the method according to the foregoing embodiments may be implemented through software and a necessary general hardware platform, and certainly, may also be implemented by hardware, but in many cases, the former manner is a better implementation. Based on such an understanding, the technical solutions of this application essentially, or the part contributing to the prior art may be implemented in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the methods according to the embodiments of this application.

Although the embodiments of this application have been described above with reference to the accompanying drawings, this application is not limited to the specific implementations described above, and the specific implementations described above are merely exemplary and not limitative. A person of ordinary skill in the art may make various variations under the teaching of this application without departing from the spirit of this application and the protection scope of the claims, and such variations shall all fall within the protection scope of this application.

What is claimed is:

1. A channel monitoring method, applied to a terminal, the method comprising:
    monitoring a PDCCH in at least two physical downlink control channel (PDCCH) monitoring occasions,
    wherein, each of the PDCCH monitoring occasions corresponds to a part of control channel elements (CCEs) of the PDCCH;
    wherein, before the monitoring a PDCCH in at least two physical downlink control channel (PDCCH) monitoring occasions, the method further comprises:
    determining a quantity of the CCEs corresponding to each of the PDCCH monitoring occasions;
    wherein the determining a quantity of the CCEs corresponding to each of the PDCCH monitoring occasions comprises:
    determining the quantity of the CCEs corresponding to each of the PDCCH monitoring occasions according to an aggregation level of the PDCCH and a quantity of the PDCCH monitoring occasions;
    or, determining the quantity of the CCEs corresponding to each of the PDCCH monitoring occasions according to an indication of a network setting or according to a preset quantity of the CCEs.

2. The channel monitoring method according to claim 1, wherein indexes of resources corresponding to the CCEs in each of the PDCCH monitoring occasions are the same.

3. The channel monitoring method according to claim 1, wherein indexes of resources corresponding to the CCEs in each of the PDCCH monitoring occasions are determined according to a number of the PDCCH monitoring occasion;
    wherein the number of the PDCCH monitoring occasion is determined according to at least one of the following:
    an order of time;
    an order of frequency;
    a serving cell index;
    a control resource set index; or
    a search space set index.

4. The channel monitoring method according to claim 1, wherein transmission configuration indicator (TCI) states corresponding to different PDCCH monitoring occasions are the same or different.

5. The channel monitoring method according to claim 1, wherein transmission configuration indicator (TCI) states corresponding to the at least two PDCCH monitoring occasions are one or more TCI states configured by a network device;
    or, TCI states corresponding to the at least two PDCCH monitoring occasions are one or more TCI states activated by a media access layer control element (MAC-CE);
    or,
    the monitoring a PDCCH in at least two physical downlink control channel (PDCCH) monitoring occasions comprises:
    monitoring, in a case that a blind detection capability corresponding to PDCCH monitoring in a preset period configured by a network device is greater than a PDCCH blind detection capability of the terminal on a current serving cell, a first PDCCH or a second PDCCH preferentially in each of the PDCCH monitoring occasions,
    wherein, the blind detection capability comprises a quantity of blind detection times in the preset period and a quantity of non-overlapping CCEs in the preset period, the first PDCCH is a PDCCH configured with N monitoring resources for joint detection, the second PDCCH is a PDCCH other than the first PDCCH, and N is a positive integer greater than 1.

6. The channel monitoring method according to claim 1, further comprising: determining a terminal behavior indicated by the PDCCH according to a time unit in which a last PDCCH monitoring occasion in the at least two PDCCH monitoring occasions is located, wherein
    the terminal behavior comprises at least one of the following:
    determining a time resource for sending of a physical uplink shared channel (PUSCH) or a time resource for receiving of a PDSCH according to time domain resource allocation (TDRA) indicated by the PDCCH;
    determining, according to a PDCCH indication, a time resource used for transmitting a physical uplink control channel (PUCCH) fed back by a hybrid automatic repeat request acknowledgment (HARQ-ACK);
    bandwidth part (BWP) switching time;
    BWP switching delay;
    starting or restarting a discontinuous reception inactivity timer;
    an effective time of a minimum K0, wherein K0 is a slot offset between a PDCCH for transmitting PDSCH scheduling information and a scheduled PDSCH;
    an effective time of a minimum K2, wherein K2 is a slot offset between a PDCCH for transmitting PUSCH scheduling information and a scheduled PUSCH;
    an effective time of search space set switching; or
    indicating a slot resource at which a channel state information reference signal (CSI-RS) for reporting of aperiodic channel state information (CSI) is located.

7. The channel monitoring method according to claim 1, wherein the at least two PDCCH monitoring occasions belong to a same control resource set or belong to different control resource sets;
    or the at least two PDCCH monitoring occasions belong to a same search space set or belong to different search space sets;
    wherein, in a case that the at least two PDCCH monitoring occasions belong to the different control resource sets, at least one of the following parameters of the at least two PDCCH monitoring occasions is the same:
    a resource element group (REG) bundle size;
    an interleave size;
    a precoding granularity;
    a total quantity of CCEs of the control resource sets;
    a quantity of resource blocks of the control resource sets; or
    a quantity of symbols of the control resource sets.

8. A channel transmission method, applied to a network side device, the method comprising:
    configuring at least two physical downlink control channel (PDCCH) monitoring occasions,
    wherein, each of the PDCCH monitoring occasions corresponds to a part of control channel elements (CCEs) of the PDCCH;
    wherein a quantity of the CCEs corresponding to each of the PDCCH monitoring occasions is determined according to an aggregation level of the PDCCH and a quantity of the PDCCH monitoring occasions; or
    the method further comprising: indicating the quantity of the CCEs corresponding to each of the PDCCH monitoring occasions to a terminal.

9. The channel transmission method according to claim 8, wherein indexes of resources corresponding to the CCEs in each of the PDCCH monitoring occasions are the same.

10. The channel transmission method according to claim 8, wherein indexes of resources corresponding to the CCEs in each of the PDCCH monitoring occasions are determined according to a number of the PDCCH monitoring occasion;
wherein the number of the PDCCH monitoring occasion is determined according to at least one of the following:
an order of time;
an order of frequency;
a serving cell index;
a control resource set index; or
a search space set index.

11. The channel transmission method according to claim 8,
wherein
the method further comprises: configuring TCI transmission configuration indicator (TCI) states corresponding to the at least two PDCCH monitoring occasions.

12. A channel monitoring apparatus, applied to a terminal, the apparatus comprising: a memory, a processor and a computer program stored in the memory and executable by the processor, wherein the processor executes the computer program to:
monitor a PDCCH in at least two physical downlink control channel (PDCCH) monitoring occasions;
wherein, each of the PDCCH monitoring occasions corresponds to a part of control channel elements (CCEs) of the PDCCH;
wherein the processor further executes the computer program to:
determine a quantity of the CCEs corresponding to each of the PDCCH monitoring occasions before monitoring the PDCCH in at least two PDCCH monitoring occasions;
wherein the processor further executes the computer program to: determine the quantity of the CCEs corresponding to each of the PDCCH monitoring occasions according to an aggregation level of the PDCCH and a quantity of the PDCCH monitoring occasions;
or, determines the quantity of the CCEs corresponding to each of the PDCCH monitoring occasions according to an indication of a network setting or according to a preset quantity of the CCEs.

13. The channel monitoring apparatus according to claim 12, wherein indexes of resources corresponding to the CCEs in each of the PDCCH monitoring occasions are the same.

14. The channel monitoring apparatus according to claim 12, wherein indexes of resources corresponding to the CCEs in each of the PDCCH monitoring occasions are determined according to a number of the PDCCH monitoring occasion;
wherein the number of the PDCCH monitoring occasion is determined according to at least one of the following:
an order of time;
an order of frequency;
a serving cell index;
a control resource set index; or
a search space set index.

15. The channel monitoring apparatus according to claim 12, wherein transmission configuration indicator (TCI) states corresponding to different PDCCH monitoring occasions are the same or different.

16. The channel monitoring apparatus according to claim 12, wherein transmission configuration indicator (TCI) states corresponding to the at least two PDCCH monitoring occasions are one or more TCI states configured by a network device;

or, TCI states corresponding to the at least two PDCCH monitoring occasions are one or more TCI states activated by a media access layer control element (MAC-CE);
or,
the processor executes the computer program to: monitor, in a case that a blind detection capability corresponding to PDCCH monitoring in a preset period configured by a network device is greater than a PDCCH blind detection capability of the terminal on a current serving cell, a first PDCCH or a second PDCCH preferentially in each of the PDCCH monitoring occasions;
wherein, the blind detection capability comprises a quantity of blind detection times in the preset period and a quantity of non-overlapping CCEs in the preset period, the first PDCCH is a PDCCH configured with N monitoring resources for joint detection, the second PDCCH is a PDCCH other than the first PDCCH, and N is a positive integer greater than 1.

17. The channel monitoring apparatus according to claim 12, further comprising: the processor further executes the computer program to: determine a terminal behavior indicated by the PDCCH according to a time unit in which a last PDCCH monitoring occasion in the at least two PDCCH monitoring occasions is located, wherein
the terminal behavior comprises at least one of the following:
determining a time resource for sending of a physical uplink shared channel (PUSCH) or a time resource for receiving of a PDSCH according to time domain resource allocation (TDRA) indicated by the PDCCH;
determining, according to a PDCCH indication, a time resource for transmitting a physical uplink control channel (PUCCH) fed back by a hybrid automatic repeat request acknowledgment (HARQ-ACK);
bandwidth part (BWP) switching time;
BWP switching delay;
starting or restarting a discontinuous reception inactivity timer;
an effective time of a minimum K0, wherein K0 is a slot offset between a PDCCH for transmitting PDSCH scheduling information and a scheduled PDSCH;
an effective time of a minimum K2, wherein K2 is a slot offset between a PDCCH for transmitting PUSCH scheduling information and a scheduled PUSCH;
an effective time of search space set switching; or
indicating a slot resource at which a channel state information reference signal (CSI-RS) for reporting of aperiodic channel state information (CSI) is located.

18. A channel transmission apparatus, applied to a network side device, the apparatus comprising: a memory, a processor and a computer program stored in the memory and executable by the processor, wherein the processor executes the computer program to implement the steps of the information configuration method according to claim 8.

19. A non-transitory readable storage medium, storing a computer program which, when executed by a processor of a terminal, causes the processor to implement the steps of the information configuration method according to claim 1.

20. A non-transitory readable storage medium, storing a computer program which, when executed by a processor of a network side device, causes the processor to implement the steps of the information configuration method according to claim 8.

* * * * *